Aug. 4, 1953

R. F. MAHONEY 2,647,959

TELEPHONE HANDSET LOCKING CLIP

Filed March 14, 1950

INVENTOR.
ROBERT F. MAHONEY
BY
John J. Hanrahan
ATTORNEY

Patented Aug. 4, 1953

2,647,959

UNITED STATES PATENT OFFICE 2,647,959

TELEPHONE HANDSET LOCKING CLIP

Robert F. Mahoney, Milford, Conn.

Application March 14, 1950, Serial No. 149,600

3 Claims. (Cl. 179—178)

This invention relates to new and useful improvements in locking clips and has particular relation to a telephone handset locking clip.

An object of the invention is to provide a clip which may be readily and quickly applied to a desk-type telephone set without the use of tools and without the altering or marring in any way of such set; which clip is easily positioned for securing the telephone handle or hand set of a monophone type in position in the cradle of the dial carrying pedestal against casual movement therefrom; and which clip includes a portion readily movable to release the hand set for use without releasing the clip from the base and which portion is thereafter again easily moved into locking position over the hand set.

Another object is to provide a clip for the purpose described and which is of simple and inexpensive construction, which does not detract from the appearance of the telephone set, and which is reliable and efficient in use.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

Figures 1, 2, 3:
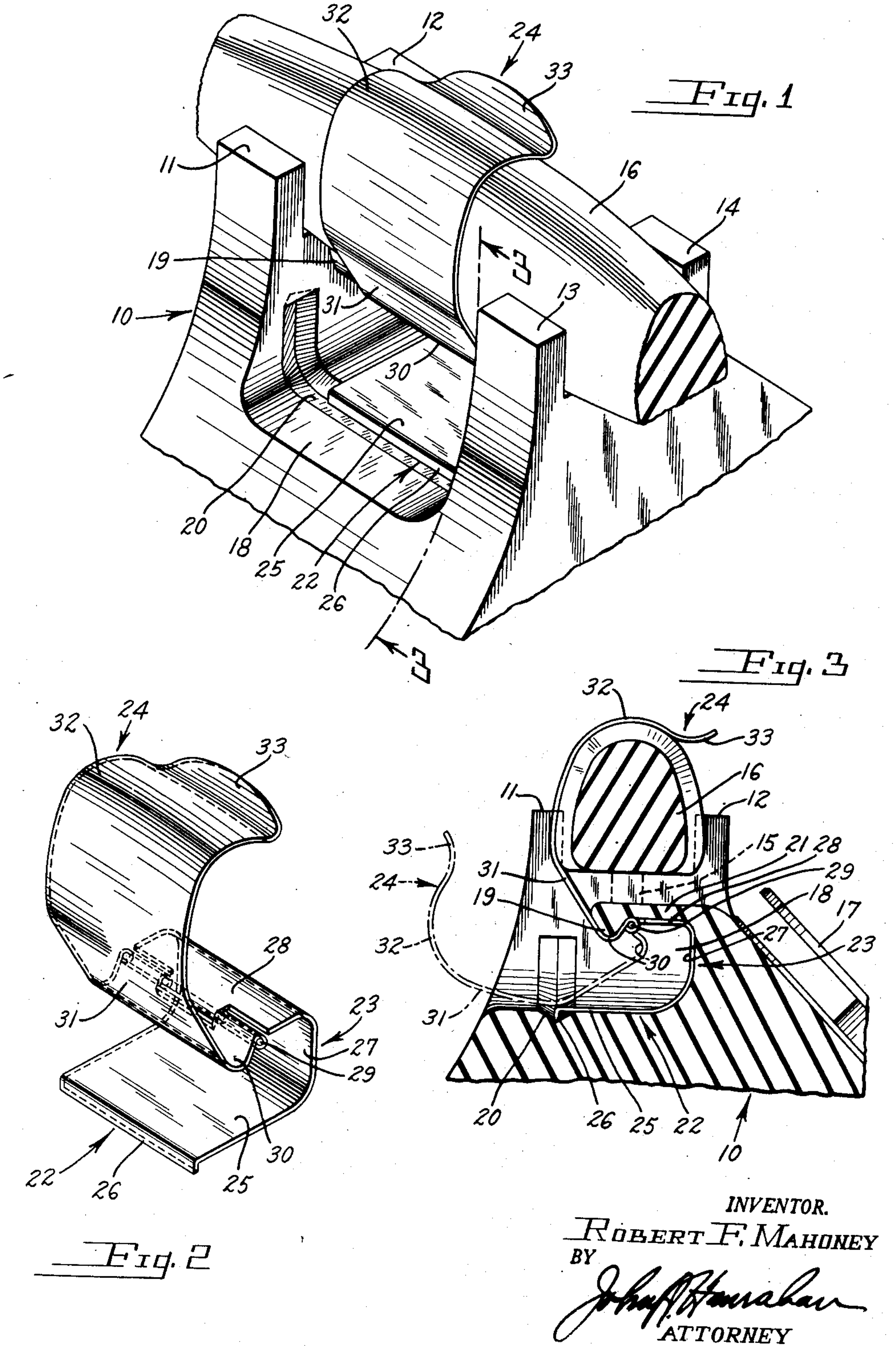
Fig. 1 is an isometric view showing the upper portion of a desk-type telephone set to which my improved clip has been applied.
Fig. 2 is an isometric view showing the clip alone.
Fig. 3 is a sectional view taken as along the plane of the line 3—3 of Fig. 1 and showing the clip of the invention applied to a desk-type telephone set.

Referring in detail to the drawing, at 10 is generally indicated the base of a telephone set and which base includes a cradle-like structure formed by pairs of uprights or posts 11 and 12, and 13 and 14, respectively. Between the posts of the pairs are located the customary plungers 15 designed to be depressed when the handle 16 of the telephone is placed in the cradle whereby the plungers maintain switches in open circuit relation. These plungers are designed to move upwardly to permit of closing of such switches when the handle 16 is removed from the cradle.

Base 10 mounts any of the usual dial 17. Closed at its forward side and opening through the rear side of the portion of the base between the posts 11 and 13 is a recess 18 into which the fingers may be inserted for lifting and carrying of the telephone set. This recess is also closed at its bottom and for substantially the entire extent of its top side by a top wall 21 and such top wall toward its rear or open end is thickened or enlarged providing a downwardly extending lip portion 19. Then the bottom wall of the recess rearwardly of said lip 19 is provided with a groove or channel 20 providing a forwardly facing shoulder at its rearward side. When the handle 16 is on the base 10 the mid-portion of such handle is substantially over the top wall 21 of the recess 18.

It frequently happens that when a telephone is in a place where it can be reached by a young child, the child will get the hand set of the telephone off the base or "off the hook" permitting the plungers 15 to rise to circuit closing positions. Then on any attempt to call the number of that telephone a busy signal is given to the proposed caller. If that telephone is installed on a party line, the telephones of all parties on that line are "out of order" or are "busy."

Again, it happens that where telephones are installed in stores or the like, something is placed near the phone and, in fact, in contact with it, tilting the hand set or moving it to "off the hook" position, as by propping it up from the cradle. Under these and other conditions, where the hand set is accidentally or inadvertently off the base or "off the hook," the telephone for the purpose of receiving calls is rendered useless, both for the purpose of receiving calls and for the purpose of making calls.

According to my invention, a simple, reliable and inexpensive means is provided for locking the hand set in position on the telephone base when the telephone is not in use. This means will prevent removal of the hand set from the telephone base by a child of such young years as to simply regard the telephone as something with which to play, and will also prevent accidental or casual tilting or moving of the hand set from the base.

Yet the means of the invention is such that by a very simple operation it is rendered ineffective so that the hand set may be removed from the base in the usual manner. Again the locking means of the invention is readily rendered effective by a very simple operation after the hand set has been replaced in the cradle of the base of the telephone.

The clip of the invention I generally designate 22 and the same is made up generally of a pair of portions comprising a mounting portion 23 and a locking portion 24. As herein disclosed, these clip portions are formed of strip stock of metal although they may be formed of a suitable plastic if desired.

Mounting portion 23 includes a bottom wall 25, the outer or rear end portion of which is angularly disposed providing a depending lip 26. Then at the inner end of portion 25 the stock of the mounting portion is carried upwardly as at 27 and it is then bent rearwardly providing a portion 28 substantially parallel with the portion 25. At the free end of portion 28, the locking member 24 is hingedly connected to the mounting member 23 as by the hinge 29. This is shown generally as a piano-type hinge.

From its hinged connection 29 the locking member 28 includes a rebent or channel-like portion 30 of the contour of the depending lip 19 of the telephone base. Then the stock of member 24 is carried rearwardly and upwardly at 31 and curved downwardly and forwardly as at 32 and the same terminates in an outwardly bent lip-like portion 33. If desired, the forward side or, in fact, both sides of the curved portion 32 may bear advertisements. For this purpose, the forward or free side of said curved portion may be widened or enlarged laterally.

In mounting my clip 22 on the telephone base 10, mounting member 23 is pushed into the recess 18 of the base. Such mounting member when fully home has its depending lip or ledge 26 entering in the recess 20 in the base against the forwardly facing shoulder at the rearward side of said recess; has its portion 25 against the bottom wall of recess 18; has its portion 27 against the front wall of said recess; and has its portion 28 against the underside of the top wall 21 of the recess. Then the formed portion 31 of the locking member 24 is positioned to extend around the lip 19 (see Fig. 3) and this locates the hinge 29 at the juncture of the underside of wall 21 and the inner edge of the lip 19.

After the clip is installed, the mounting member assumes the position described. Such member is of spring-like stock whereby the lip or ledge 26 is sprung into channel or groove 20 and the hinge 29 is sprung or snapped into position at the inner side of the lip 19 of the telephone base. Thus, the mounting member 23 is resiliently held in place or is sprung into position in the recess 19. Now the locking member 24 will assume the dotted line position of Fig. 3.

When the hand set is to be locked in position on the base 10, the portion 24 of my clip is swung up to the full line position of Fig. 3 and is snapped over the midportion of the hand set 16. Now, on any attempt to lift the hand set out of the cradle of base 10, the whole base will be lifted and thus lifting of the hand set is prevented. Therefore, a child cannot accidentally remove the hand set from the base and in a store or the like, the placing of articles on or about the telephone will not casually serve to tilt the hand set or to move it from the base or to prop it in a raised position permitting of plungers 15 moving to closed circuit positions.

However, when the telephone is to be used, it is merely necessary that the prospective user place his thumb under the lip-like portion 33 of the locking member 24 springing such member open so as to have it clear the high point or crown extending down the upper longitudinal median line of the handle, when the clip will fall back to the dotted line position of Fig. 3 and the hand set is free for use.

After the telephone has been used, the user places the hand set back in the cradle and then merely swings the locking member 24 upwardly on the hinge 29 and snaps the curved portion 32 of the locking device over the upper side of the handle portion 16 of the hand set, i. e., back to the full line position of Fig. 3. Now the hand set is securely locked to the base against casual movement therefrom or from the cradle.

The clip mounting portion is snapped or sprung into place in the telephone base. That is, the length of the stock of mounting portion 24, measured along from the ledge 26 to the hinge 29, is such that the stock hugs the wall of the recess and the hinge 29 must be sprung or snapped into position back of the lip 19. Then locking portion 24 is snapped into locking position. To do so its channel formation 30 is drawn about the lip 19 or is sprung about such lip. Therefore, there is a resilience in the portion 24 resisting movement from the dotted to the full line position of Fig. 3. Additionally, the curved portion 32 of member 24 is sprung or snapped over the crown of handle 16. Therefore, the latter is tightly held in or on the cradle. Releasing of the clip entails a springing open of the curve 32 to free the clip of the crown of handle 16.

Having thus set forth the nature of my invention, what I claim is:

1. A locking clip for use with a desk-type telephone comprising a base and a handset having a position of non-use on said base and said base having a recess therein below the position of non-use of the handset and opening through the rear side of the base, substantially parallel top and bottom walls and a front wall connecting said top and bottom walls defining three of the limits of said recess, said locking clip comprising a mounting member including top and bottom walls and a front wall connecting said top and bottom walls, said mounting member of spring stock and of a shape and size to be snapped into place in said recess with its walls engaging the corresponding walls of said recess, and a locking member hinged at its lower end to the rear edge of the top wall of said mounting member for hinged movement from a released position within said recess and partly resting on said base to a locking position in which it is disposed at the rearward side and is hooked over the top of said handset and secures said handset in its position of non-use on said base.

2. A locking clip for use with a desk-type telephone comprising a base and a handset having a position of non-use on said base and said base having a recess therein below the position of non-use of the handset and opening through the rear side of the base, substantially parallel top and bottom walls and a front wall connecting said top and bottom walls defining three of the limits of said recess, a depending rib at the rear end of said top wall, said locking clip comprising a mounting member including top and bottom walls and a front wall connecting said top and bottom walls, said mounting member of spring stock and of a shape and size to be snapped into place in said recess with its walls engaging the corresponding walls of said recess and with the rear end of said top wall at the forward edge of the base of said rib, a locking member including a generally upwardly extending rearward portion and a forwardly and downwardly curved upper portion, said locking member at its lower end carrying a channel-like portion of a shape and size to embrace said depending rib, a hinge at the free edge of said channel-like portion and hinging said locking member to the rear edge of said top wall forwardly of said rib, for hinged movement from a released position within said recess partly resting on said base to a locking position in which said forwardly and downwardly curved portion of said locking member is snapped about the handset of the telephone when said handset is in a position of non-use on said base, and said locking member at such time having its channel-like portion embracing said depending rib in substantially vertically opposed relation to said forwardly and downwardly curved upper portion.

3. A locking clip for use with a desk-type telephone comprising a base and a handset having a position of non-use on said base and said base having a recess therein below the position of non-use of the handset and opening through the rear side of the base, substantially parallel top and bottom walls and a front wall connecting said top and bottom walls defining three of the limits of said recess, a depending rib at the rear end of said top wall, and said base having a shoulder in the bottom wall of said recess and located rearwardly of said depending rib, said locking clip comprising a mounting means including top and bottom walls and a front wall connecting said top and bottom walls, said mounting member of spring stock and of a shape and size to be snapped into place in said recess with its walls engaging the corresponding walls of said recess and with the rear end of said top wall at the forward edge of the base of said rib, a depending lip at the rear end of the bottom wall of said mounting member to engage against said shoulder, a locking member including a generally upwardly extending rearward portion and a forwardly and downwardly curved upper portion, said locking member at its lower end carrying a channel-like portion of a shape and size to embrace said depending rib, a hinge at the free edge of said channel-like portion and hinging said locking member to the rear edge of said top wall forwardly of said rib, for hinged movement from a released position within said recess partly resting on said base to a locking position in which said forwardly and downwardly curved portion of said locking member is snapped about the handset of the telephone when said handset is in a position of non-use on said base, and said locking member at such time having its channel-like portion embracing said depending rib in substantially vertically opposed relation to said forwardly and downwardly curved upper portion.

ROBERT F. MAHONEY.

References Cited in the file of this patent

UNITED STATES PATENTS

| Number | Name | Date |
|---|---|---|
| 2,215,874 | Gienger | Sept. 24, 1940 |
| 2,320,838 | Watson | June 1, 1943 |
| 2,488,516 | Shore | Nov. 15, 1949 |
| 2,547,420 | Sumner | Apr. 3, 1951 |
| 2,558,661 | Murray | June 26, 1951 |
| 2,564,262 | Hutson | Aug. 14, 1951 |